(12) United States Patent
Schnitzer et al.

(10) Patent No.: US 10,919,563 B2
(45) Date of Patent: Feb. 16, 2021

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Hieronymus Schnitzer, Gamprin (LI); Richard Wiebe, Eschen (LI); Ciprian Paltinisanu, Eschen (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 54 days.

(21) Appl. No.: 16/481,932

(22) PCT Filed: Jan. 31, 2018

(86) PCT No.: PCT/EP2018/052448
§ 371 (c)(1),
(2) Date: Jul. 30, 2019

(87) PCT Pub. No.: WO2018/141819
PCT Pub. Date: Aug. 9, 2018

(65) Prior Publication Data
US 2020/0039569 A1 Feb. 6, 2020

(30) Foreign Application Priority Data
Feb. 2, 2017 (DE) .................. 10 2017 201 708

(51) Int. Cl.
*B62D 1/184* (2006.01)
*B62D 1/185* (2006.01)
*B62D 1/19* (2006.01)

(52) U.S. Cl.
CPC ............. *B62D 1/195* (2013.01); *B62D 1/184* (2013.01); *B62D 1/192* (2013.01); *B62D 1/185* (2013.01)

(58) Field of Classification Search
None
See application file for complete search history.

(56) References Cited

U.S. PATENT DOCUMENTS 8,366,149 B2 * 2/2013 Sulser .................... B62D 1/195
280/775
8,474,869 B2 * 7/2013 Sulser .................... B62D 1/184
280/777

(Continued)

FOREIGN PATENT DOCUMENTS

DE 10 2009 059 159 B 1/2011

OTHER PUBLICATIONS

English Translation of International Search Report issued in PCT/EP2018/052448, dated May 18, 2018.

*Primary Examiner* — Faye M Fleming
(74) *Attorney, Agent, or Firm* — thyssenkrupp North America, LLC

(57) ABSTRACT

A steering shaft axially mounted rotatably in a shell and a guide part by which the shell is held. An energy absorption device arranged between the guide and shell has a bending wire coupled by a first end to the shell and a second end to the guide. A rail is attached to the shell. A pin is coupled to the guide. The second end of the bending wire has a coupling section that engages behind the pin and is braced at a support point on the side wall in the event of a crash and the support point is arranged on the side of the pin gripped by the coupling section. The pin has a first spacing from the side wall. A second spacing between the pin and the support point measured axially is at least 1.1 times the first spacing.

7 Claims, 5 Drawing Sheets

(56) References Cited

U.S. PATENT DOCUMENTS

| | | | |
|---|---|---|---|
| 10,464,592 B2* | 11/2019 | Messing | B62D 1/181 |
| 10,532,762 B2* | 1/2020 | Sulser | B62D 1/195 |
| 10,759,465 B2* | 9/2020 | Ganahl | B62D 1/185 |
| 10,787,191 B2* | 9/2020 | Kreutz | B62D 5/0409 |
| 2020/0172148 A1* | 6/2020 | Schnitzer | B62D 1/192 |
| 2020/0207403 A1* | 7/2020 | Kirmsze | B62D 1/181 |
| 2020/0317251 A1* | 10/2020 | Munding | B62D 1/192 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/052448, filed Jan. 31, 2018, which claims priority to German Patent Application No. DE 10 2017 201 708.2, filed Feb. 2, 2017, the entire contents of both of which are incorporated herein by reference.

FIELD

The present disclosure generally relates to a steering column for a motor vehicle.

BACKGROUND

Such a steering column is known from DE 10 2009 059 159 B3. In the known steering column, a bending wire is coupled by two lugs to the toothed plate and thus to the guide part. The two lugs are required in order to prevent a bending of the attachment section of the bending wire, since the attachment section would not be fixed securely enough with a single lug. The drawback of this solution is that the design is space intensive and expensive.

Thus, a need exists for a steering column so that the design space requirement of the energy absorption device is reduced and its secure functioning is ensured.

DETAILED DESCRIPTION

Figure 1:
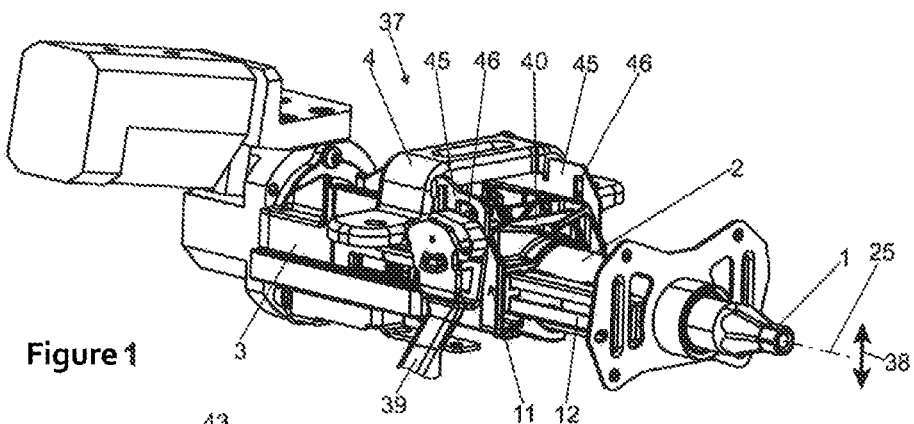
FIG. 1 is a perspective overall view of an upper part of a steering column.
Figure 2:
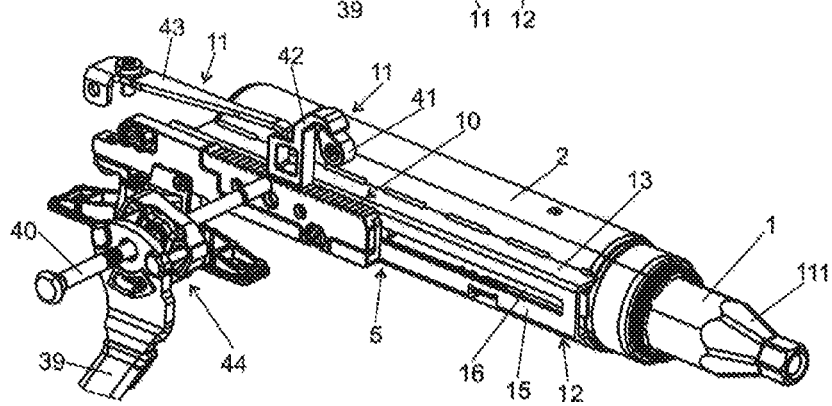
FIG. 2 is a perspective detailed view of the steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, having a steering shaft which is mounted rotatably about its longitudinal axis in a shell part, having a guide part by which the shell part is held and an energy absorption device arranged in an operative manner between the guide part and the shell part and which comprises at least one bending wire, which is coupled by means of a first end section to the shell part and by means of a second end section to the guide part, wherein a rail is attached by means of at least one side wall to the shell part, wherein a pin is coupled to the guide part and the second end section of the bending wire comprises a coupling section which engages behind the pin and is braced at least at a support point on the side wall at least in the event of a crash.

The solution according to the invention proposes that the support point is arranged on the side of the pin which is gripped by the coupling section, and the pin comprises a first spacing from the side wall, while a second spacing between the pin and the support point measuring in the axial direction is at least 1.1 times the first spacing.

The second spacing is measured between the at least one support point and the outermost axial point of the pin on the side where the coupling section engages behind the pin. By the outermost axial point of the pin is meant the outermost extension of the pin in the direction of the longitudinal axis.

The at least one support point at which the coupling section of the bending wire is braced against the side wall is preferably a point of a support surface between the coupling section of the bending wire and the side wall. In one advantageous modification it may be provided that an intermediate element, such as an insert plate, is provided between the side wall and the coupling section of the bending wire. Thus, the bracing of the coupling section occurs via the at least one support point by the intermediate element against the side wall.

The broadened coupling section according to the invention prevents a slipping of the second end section of the bending wire off from the pin. In particular, in the case of a pulling coupling of the coupling section to the pin, a bending open of the second end section of the bending wire is effectively prevented. But also in the case of a pushing type bracing, the broadened coupling section prevents the second end section of the bending wire from slipping through between the pin and the side wall. Because the at least one support point is arranged on the side of the pin which is gripped by the coupling section and the support point is at least 1.1 times the first spacing, a bracing of the coupling section against the side wall is assured, which prevents a bending open of the coupling section when force is applied and furthermore a moving through of the coupling section between the pin and the side wall is prevented. In no case are two pins required for the secure coupling of the second end section of the bending wire. As compared to the known prior art, therefore, one pin can be spared, which results in a smaller design length in the axial direction. Especially in embodiments with two or more bending wires arranged in axial succession, a twofold or multiple sparing of axial design space is achieved.

Preferably, the second spacing amounts to at least 1.3 times the first spacing. Hence, the support point has a corresponding spacing with respect to the pin, so that the bracing effect can be further improved.

Preferably, the second spacing amounts to at most 4 times the first spacing. Hence, the at least one support point has a corresponding spacing with respect to the pin, so that the bracing effect can be achieved and at the same time a space-saving design is assured.

In one advantageous modification, it may be provided that the pin is connected to a toothed plate, while the toothed plate is axially movable with respect to the guide part and can be axially arrested by a locking device with respect to the guide part, so that under the action of axial forces arising in the event of a crash an axial displacement of the shell part with respect to the toothed plate arrested on the guide part deforms the bending wire and in this way a portion of the kinetic energy is absorbed by the bending wire.

Advantageously, the energy absorption device of the steering column according to the invention comprises at least two bending wires, arranged axially one behind the other, while the toothed plate comprises at least two radially projecting pins, a first pin being situated at an axial spacing from a second pin, and the second end sections of the at least two bending wires, which are respectively broadened at coupling sections, engage behind the respective pins and are braced against the side wall of the rail at a respective support point, and at least one bending wire can be deactivated by means of a switch. The energy absorption device can absorb more kinetic energy with two bending wires than with a single bending wire. Thanks to the provision that at least one bending wire can be deactivated by means of a switch, the absorbable energy can be adapted to the particular crash situation, for example, to the circumstance of whether the driver has his seat belt on or not. If, in the latter case, a lot of energy must presumably be absorbed, both bending wires are deformed. But if less energy should be absorbed, one bending wire may be deactivated by means of the switch, so that only a single bending wire is deformed.

In one advantageous embodiment of the invention, at least one second pin of the toothed plate is configured as a sliding block and is received axially movably in a longitudinal groove of the toothed plate, wherein the axial displacement of the sliding block in the longitudinal groove can be blocked by a bolt which is retractable by means of the switch. As long as the switch is not activated, the bolt is not retracted and it blocks the displacement of the sliding block in the longitudinal groove of the toothed plate. Therefore, the second pin can be displaced just as little as the first pin with respect to the toothed plate. Yet this has the result that, in the event of a crash, under a relative displacement between the shell part displaced in the direction of travel and the toothed plate fixed to the carrier piece, both bending wires are deformed and will absorb a lot of energy. But if the switch is activated in the event of a crash, the bolt is retracted and an axial displacement of the sliding block in the longitudinal groove of the toothed plate becomes possible. Now, if the shell part is displaced in the direction of travel, the second bending wire carries along the second pin, so that the second pin is displaced in the longitudinal groove of the toothed plate and the second bending wire remains nondeformed. Only the first pin is immovable with respect to the toothed plate and therefore results in a deformation of the first bending wire. In this case, less energy is absorbed by a single bending wire alone than in the aforementioned case by two bending wires.

Advantageously, the switch is designed as a pyrotechnic switch. A pyrotechnic switch can be electrically ignited in the event of a crash by a central control unit of the motor vehicle and therefore deactivates one of the bending wires in good time, within fractions of a second, before the driver makes impact with the steering wheel, if the central control unit has determined that less energy needs to be absorbed.

Advantageously, the coupling section of the bending wire has a horn-shaped supporting section, whose free end is braced against the side wall of the rail at the support point.

Advantageously, in the case of a pulling coupling of the bending wire to the pin of the toothed plate, the coupling section of the second end section of the bending wire has a horn-shaped supporting section, whose free end is braced against the side wall of the rail. This measure ensures that the coupling section always lies firmly against the pin of the toothed plate and cannot slip off.

The coupling of the bending wire can be further improved by clamping the second end section of the bending wire between the respective pin of the toothed plate and the side wall of the rail.

In the case of a pushing type coupling of the bending wire to the pin of the toothed plate, the first end section of the respective bending wire secured to the shell part advantageously has an angled free end, which engages behind a first protrusion of the shell part, the first end section being clamped between the first protrusion and at least one second protrusion of the shell part. In this way, the first end section of the respective bending wire which is fastened on the shell part and which is stressed in this instance by tension in the event of a crash is securely fixed on the shell part.

Advantageously, the first protrusion of the shell part extends axially across a portion of the first end section, against which the protrusion lies, while a second protrusion and a third protrusion of the shell part are arranged opposite the first protrusion at an axial spacing with respect to each other. In this way, the first end section of the respective bending wire is secured even better on the shell part.

FIG. 1 shows an overall view of an upper piece of an adjustable steering column 37 for a motor vehicle, wherein a steering shaft 1 is mounted rotatably about a longitudinal axis 25 within a shell part 2. The shell part 2 in turn is mounted axially displaceably on a guide part 3, so that a length adjustment of the steering column and the steering wheel (not shown) is made possible. The guide part 3 in turn is mounted pivotably in the vertical direction 38 on a carrier 4 bolted tightly to the vehicle chassis, in order to make possible a height adjustment of the steering column 37 and the steering wheel (not shown).

In order to prevent an unintentional length adjustment or height adjustment of the steering shaft 1 and the steering wheel (not shown) during the driving of the motor vehicle, a locking device 11 is provided, which can be locked or released by a lever 39. If the lever 39 is swiveled, it will turn a cam 41, which in turn lifts a bar 42 upward against the force of a leaf spring 43. On its underside, the bar 42 has a toothing, which can engage with a toothing of the toothed plate 10. By raising the bar 42, it is lifted off from the toothed plate 10, so that the toothed plate 10 can be moved freely together with the shell part 2 in the axial direction. If one swivels the lever 39 in the opposite direction, the cam 41 will release the bar 42, which is then forced downward by the leaf spring 43 against the toothed plate 10. In this process, the toothing of the bar 42 engages with the toothing of the toothed plate 10, so that a displacement in the axial direction is no longer possible between the toothed plate 10 and the bar 42. The bar 42 in turn is mounted on the guide part 3, which can swivel in the vertical direction 38, but is mounted immovably in the axial direction on the carrier 4.

The lever 39 is furthermore connected to a tightening device 44, comprising a cam disk, which can be turned by the lever 39. The cam disk interacts via tilting pins with a clamping part, which is pressed in the direction of the bolt axis by the turning of the cam disk. The bolt 40 passes through two clamping jaws 45, which are arranged on either side of the guide part 3. Two vertical slots 46 are provided as the passage for the bolt 40 in the clamping jaws 45. In this way, the bolt 40 can be displaced in the vertical slots 46 in the vertical direction 38, wherein the guide part 3 connected to the bolt 40 can likewise swivel in the vertical direction 38. If the lever 39 is moved into the locking position, the tightening device 44 will ensure that the bolt 40 and thus the guide part 3 are grasped by the clamping jaws 45 of the carrier 4 and thus locked and secured against displacements in the vertical direction 38.

Figure 3:
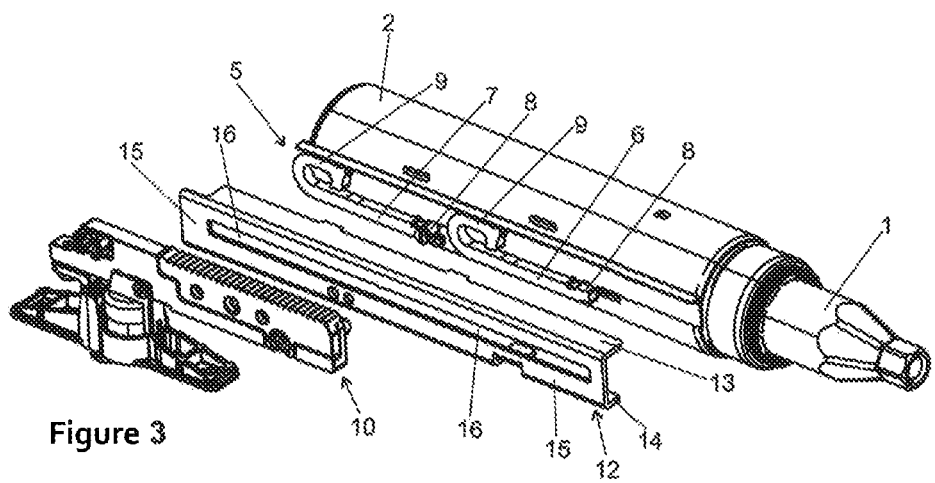
FIG. 3 is a further partial perspective view of the steering column.
Figure 4:
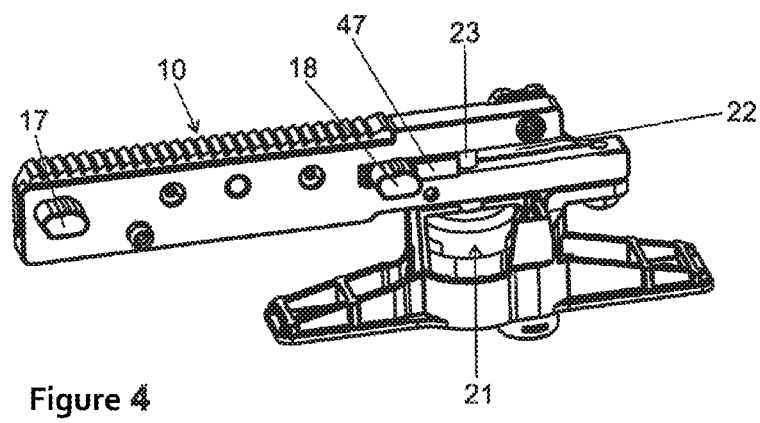
FIG. 4 is a perspective view of a toothed plate.
Figure 5:
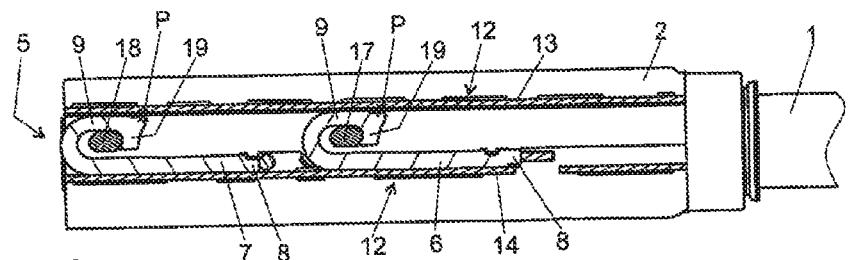
FIG. 5 is a partial sectional view of an energy absorption device in a first embodiment.

The steering column 37 according to the invention is outfitted with an energy absorption device 5, whose design can be best seen from FIGS. 3 to 5. The energy absorption device 5 shown comprises two bending wires 6, 7, one of which can be decoupled from the flow of force. However, the invention furthermore includes energy absorption devices with one or more than two bending wires which can be switched on and off. By the term "bending wire" mentioned in this specification is meant all deformation components which can absorb kinetic energy by deformation, especially also bending strips.

The bending wires 6, 7, 26, 27 of the exemplary embodiments shown in FIGS. 3 to 6a and 7 to 9 all have a first end section 8, 28, which is firmly connected to the shell part 2, and a second end section 9, 29 which stands in connection with the toothed plate 10 arrested on the guide part 3. For this purpose, the toothed plate 10 is provided with two pins 17, 18, 31, 32, to which the respective second end sections 9, 29 of the bending wires 6, 7, 26, 27 are coupled.

On the shell part 2 there is provided a C-shaped rail 12 to receive the energy absorption device 5, comprising two side walls 13, 14 and a middle section 15, which is provided with an axially oriented longitudinal slot 16. The bending wires 6, 7 or 26, 27 are received inside the C-shaped rail 12, the side walls 13, 14 of the rail 12 being welded to the shell part 2 and the middle section 15 of the rail 12 covering the bending wires 6, 7 or 26, 27. The pins 17, 18 or 31, 32 of the toothed plate 10 stand off radially inward from the toothed plate 10 in the installed condition, relative to the axis of rotation 25 of the steering shaft 1, and protrude through the longitudinal slot 16 of the rail 12 into the interior of the energy absorption device 5, where they engage with the second end section 9, 29 of the bending wires 6, 7 or 26, 27.

Figure 6:
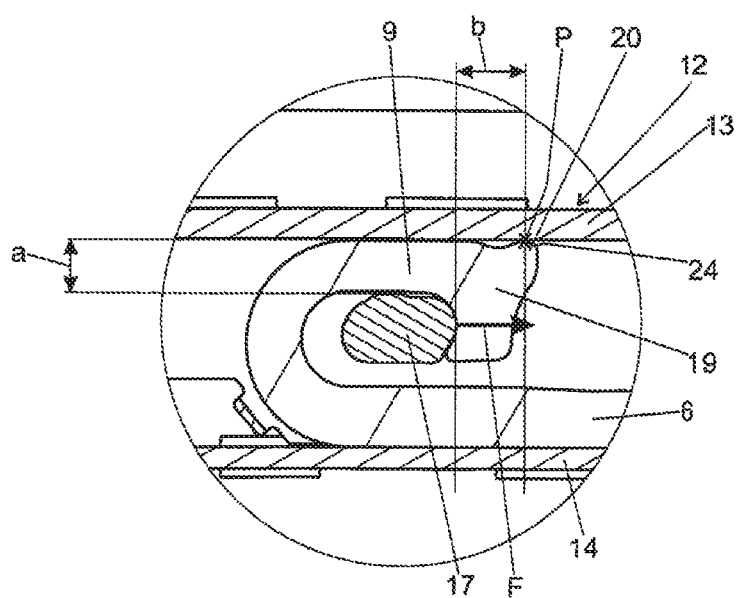
FIG. 6 is an enlarged detailed view of FIG. 5.
Figure 6A:
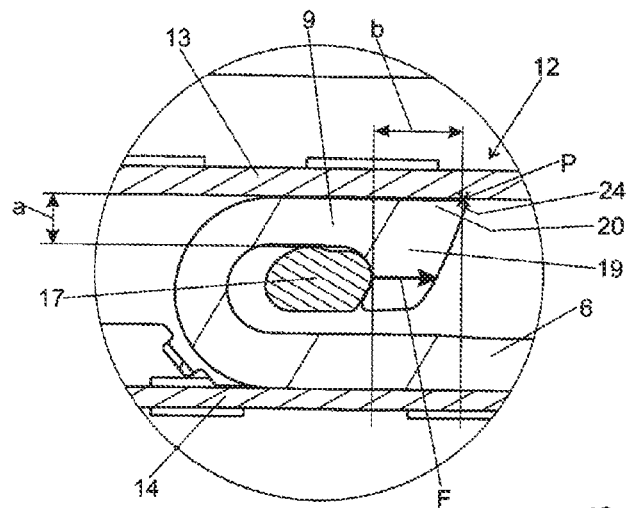
FIG. 6a is an enlarged detailed view similar to FIG. 6 in a second alternative embodiment.

FIGS. 6 and 6a show an enlarged cut-out view, revealing the interaction between the second end section 9 of the first bending wire 6 and the first pin 17 of the toothed plate 10, the coupling section of FIG. 6a having an alternative configuration. The two bending wires 6, 7 have a coupling section 19 formed at their respective second end section 9, which on the one hand engages behind the pin 17, 18 and on the other hand is braced against the side wall 13 of the rail 12 at the support point P. For this purpose, a supporting section 20 is formed on the coupling section 19, which lies against the side wall 13. The pin 17 has a first spacing a from the side wall 13. The support point P has a second spacing b from the outermost axial point of the pin 17 on the side where the coupling section 19 engages behind the pin 17. The second spacing b is larger than the first spacing a. By the outermost axial point of the pin 17 is meant the outermost extension of the pin 17 in the direction of the longitudinal axis 25. In this embodiment, the outermost extension of the pin 17 corresponds to the point of introduction of a force of the force F acting in the event of a crash between the pin 17 and the coupling section 19 of the bending wire 6.

When, in the event of a crash, an axial force is exerted by the driver impacting against the steering wheel (not shown) on the steering shaft 1 and the shell part 2, this axial force will be transmitted via the respective first end sections 8 of the two bending wires 6, 7, fastened to the shell part 2 and the side wall 14 of the rail 12, to the bending wires 6, 7, so that a pulling force F is exerted on the respective second end sections 9 with respect to the pins 17, 18, firmly connected to the toothed plate 10 arrested on the carrier 4, since the pins 17, 18 are firmly arrested and the second end sections 9 of the two bending wires 6, 7 are pulled to the front in the direction of travel, to the left in FIGS. 5 to 8.

Thanks to the configuration of the coupling sections 19 according to the invention with at least one support point P, having a second spacing b relative to the pin 17, neither can these be bent open under very large axial forces, such that the second end sections 9 of the bending wires 6, 7 would slip through between the pins 17, 18 and the side wall 13 of the rail 12. Instead, the invention has the advantage that such a sliding or slipping of the second end sections 9 is prevented with certainty. The coupling section 19 according to the invention is configured broad enough, thanks to the spacing b, which is larger than the spacing a between the pin 17 and the side wall 13, so that neither a slipping between the pins 17, 18 and the side wall 13 of the rail 12 nor a bending open of the second end section 9 is possible, because the supporting section 20 resting against the side wall 13 of the rail 12 by the support point P counteracts the bending moment in that the coupling section 19 is ideally braced against the side wall 13. The spacing a between the pin 17 and the side wall 13 is measured in a direction orthogonal to the longitudinal axis 25. The support point P is situated on the side of the pin 17 on which the coupling section 19 engages behind the pin 17. The spacing b between the pin 17 and the support point P is measured in the direction of the longitudinal axis 25, so that the support point P is distant from the pin by a spacing b.

In FIG. 6a, the support point P is a point of the support surface between the coupling section 19 of the bending wire 6 and the side wall 13, where the support point P is the support point which is most distant from the pin 17. This support point P thus corresponds to the support point furthest away from the pin 17 between the coupling section 19 and the side wall 13, measured in the axial direction.

Figure 6B:
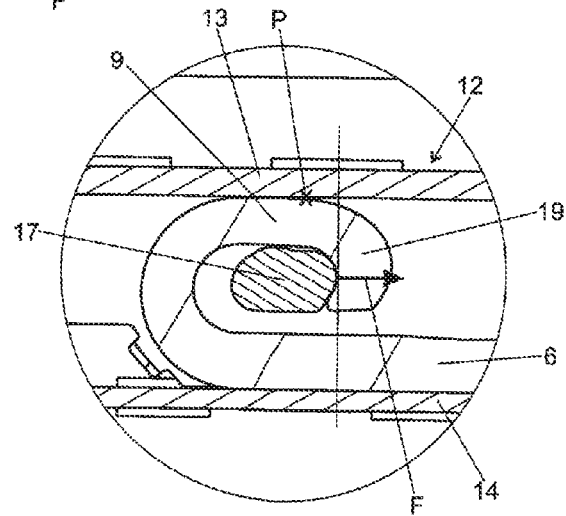
FIG. 6b is a detailed view of a coupling section of a bending wire of the prior art.

FIG. 6b shows an enlarged cut-out view, showing the interaction between the second end section 9 of the first bending wire 6 and the first pin 17 of the toothed plate 10, as is known from the prior art. The support point P between the second end section 9 and the side wall 13 is not formed on the side where the coupling section 19 engages behind the pin 17, so that there may result in an unwanted bending open of the coupling section 19, since no bracing is provided against the side wall 13 to prevent the bending open of the coupling section 19.

Advantageously in the energy absorption device according to the invention, it is possible to do away with an additional securing pin for each bending wire 6, 7, 26, 27 that would prevent a bending open of the second end section 9, 29. In this way, the installation space for the energy absorption device 5 is reduced in the axial direction by eliminating the axial extension of a no longer necessary additional securing pin. In the exemplary embodiments shown with two bending wires 6, 7 or 26, 27 arranged one behind another in the axial direction, it is even possible to spare twice the design length of the eliminated securing pin.

In the exemplary embodiments shown, the second pin 18, 32 is respectively connected to a switching device 21, 23, by which the second bending wire 7, 27 can be deactivated, so that this second bending wire 7, 27 is not deformed in the event of a crash. FIG. 4 shows the toothed plate 10 with the immovably fastened first pin 17 and the second pin 18 arranged axially displaceably in a longitudinal groove 22. The displacement of the second pin 18 in the longitudinal groove 22 is prevented by a bolt 23, which protrudes through a side opening, not shown, transversely into the longitudinal groove 22. The bolt 23 is connected to a switch 21, which in the exemplary embodiment shown is designed as a pyrotechnic switch 21. In the switching state shown, the second pin 18 is thus also connected immovably in the axial direction to the toothed plate 10.

Figure 7:
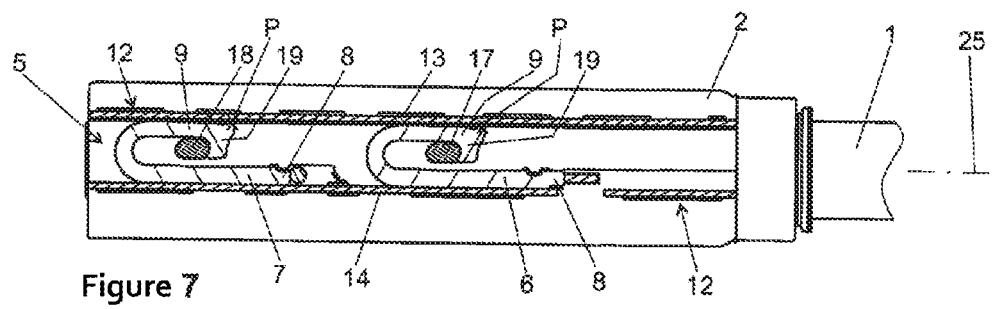
FIG. 7 is a partial sectional view of the energy absorption device of FIG. 5, but after displacement of the shell part in the event of a crash with deforming of both bending wires.

If in the event of a crash as much kinetic energy as possible needs to be absorbed, both bending wires 6, 7 or 26, 27 will need to be deformed, because two bending wires can absorb more energy than one bending wire, provided the first bending wire 6, 26 corresponds to the second bending wire 7, 27 or the force vs. distance characteristic curve. This situation is represented in FIG. 7. Here, the shell part 2 has been displaced to the left in the direction of the axis of rotation 25, while the toothed plate 10 and both pins 17, 18 were held axially immovable. As can be recognized from FIG. 7, both bending wires 6, 7 have been bent or deformed.

Figure 8:
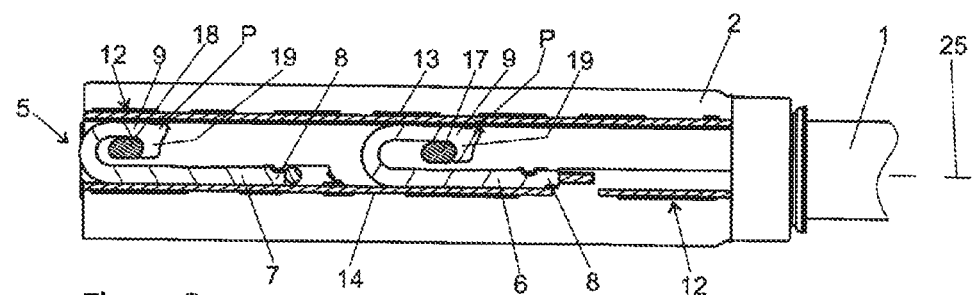
FIG. 8 is a sectional view of the same energy absorption device as in FIG. 7, but with only one deformed bending wire.

The other case, in which only the first bending wire 6 has been deformed, while the second bending wire 7 remained undeformed, is shown in FIG. 8. If, for example, a central control electronics of the motor vehicle has decided, from inputs of corresponding sensors, that less energy needs to be absorbed in the steering column in the event of a crash, the central control unit via an electric signal will activate the pyrotechnic switch 21, in which a propellant charge is ignited, which within fractions of a second pulls the bolt 23 out from the longitudinal groove 22 of the toothed plate 10. As a result, the second pin 18 becomes axially movable within the longitudinal groove 22. Now, if in the event of a crash on account of stronger axial forces the shell part 2 is displaced in the direction of the axis of rotation 25, to the left in the representation of FIG. 8, only the first pin 17 remains in place, and the first bending wire 6 will be deformed. The second pin 18, on the other hand, is easily movable within the longitudinal groove 22 of the toothed plate 10. It is therefore carried along to the left by the second bending wire 7 during the axial displacement of the shell part 2, so that its position relative to the shell part 2 does not change. The second bending wire 7 will in this case not be deformed. On the whole, the shell part 2 with the steering shaft 1 and the steering wheel (not shown) presents less resistance to an impact against the steering wheel in the last described switching state of the pyrotechnic switch 21 than in the previously described case with two deformed bending wires 6, 7 or 26, 27.

In order to ensure a secure sliding of the second pin 18 in the longitudinal groove 22 and prevent a tilting or jamming, the second pin 18 is designed as a sliding block with an elongated guide section 47 arranged in the longitudinal groove 22. The bolt 23 here lies directly against the guide section 47 of the sliding block 18, 47.

Figure 9:
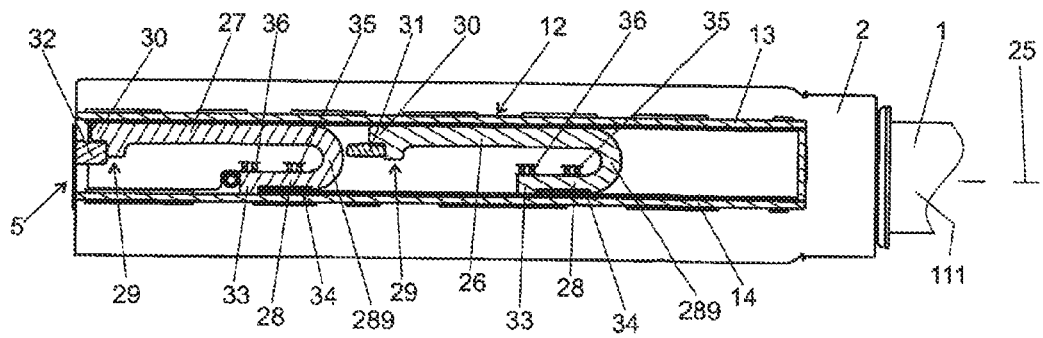
FIG. 9 is a sectional view of an energy absorption device in a second embodiment.

A further exemplary embodiment is shown in FIG. 9. FIG. 9 discloses a steering column for a motor vehicle, having a steering shaft 1, which is mounted in a shell part 2 rotatably about its longitudinal axis 25, having a guide part 3 (not shown), by which the shell part 2 is held, having an energy absorption device 5 which is arranged in an operative manner between the guide part 3 and the shell part 2 and which comprises at least one bending wire 26, 27, which is coupled by means of a first end section 28 to the shell part 2 and by means of a second end section 29 to the guide part 3, wherein a rail 12 is attached by means of at least one side wall 13 to the shell part 2, wherein a pin 31, 32 is coupled to the guide part 3 and the second end section 29 of the bending wire 26, 27 comprises a coupling section 30, wherein the bending wire 26, 27 comprises a bending segment 289 between the first end section 28 and the second end section 29, wherein the bending segment 289 is arranged on the side facing toward the steering wheel end 111 of the steering shaft 1. Preferably the bending segment 289 of at least one of the bending wires 26, 27 is situated on the side facing toward the steering wheel end 111 of the steering shaft 1. In an especially preferred embodiment, the bending segments 289 of the respective bending wire 26, 27 are situated on the side facing toward the steering wheel end 111 of the steering shaft 1, i.e., all the bending wires 26, 27 are oriented in the same direction, while the bending segment is situated on the side with the steering wheel end 111.

The respective second end sections 29 of the bending wires 26, 27 are coupled in pushing manner to the respective pins 31, 32. In this exemplary embodiment as well, the second end section 29 passes respectively into a broadened coupling section 30, which on the one hand engages by a downwardly protruding region in FIG. 9 behind the respective pin 31, 32 and is braced by a region situated between the respective pin 31, 32 and the side wall 13 of the C-shaped rail 12 against the side wall 13. Since in the second exemplary embodiment the second end section 29 is coupled in pushing manner to the respective pin 31, 32, the respective first end sections 28 of the bending wires 26, 27 must be coupled in pulling manner to the shell part 2 or the other side wall 14 of the rail 12. For this purpose, a first protrusion 34 is formed on the shell part 2, which braces the first end section 28 at the side, and an angled free end 33 of the first end section 28 engages behind it. In order to prevent a slippage of the free end 33 from the first protrusion 34, a second protrusion 35 and a third protrusion 36 are situated opposite the first protrusion 34, so that the first end section 28 is clamped between the first protrusion 34 on the one hand and the other two protrusions 35 and 36 on the other hand.

Regarding the two switching states of the switch 21, the second embodiment shown in FIG. 9 functions exactly as the first embodiment shown in the other figures. The second pin 32 in one switching state is firmly connected to the toothed plate 10 such that it opposes a displacement of the shell part 2 in the axial direction to the left just like the first pin 31, so that both bending wires 26, 27 are deformed and a larger amount of kinetic energy is absorbed with the two bending wires 26, 27.

In the other switching state, the second pin 32 with the bolt 23 retracted is axially displaceable in the longitudinal groove 22 of the toothed plate 10, so that it is carried along together with the shell part 2, displaced axially to the left, and the second bending wire 27 is not deformed. But if only the first bending wire 26 is deformed, the amount of kinetic energy absorbed is less than in the other case.

LIST OF REFERENCE SYMBOLS

1 Steering shaft
2 Shell part

3 Guide part
4 Carrier
5 Energy absorption device
6 First bending wire
7 Second bending wire
8 First end section
9 Second end section
10 Toothed plate
11 Locking device
12 Rail
13 Side wall
14 Side wall
15 Middle section
16 Longitudinal slot
17 First pin
18 Second pin
19 Coupling section
20 Supporting section
21 Switch
22 Longitudinal groove
23 Bolt
24 Free end
25 Axis of rotation
26 First bending wire
27 Second bending wire
28 First end section
29 Second end section
30 Coupling section
31 First pin
32 Second pin
33 Free end
34 First protrusion
35 Second protrusion
36 Third protrusion
37 Adjustable steering column
38 Vertical direction
39 Lever
40 Bolt
41 Cam
42 Bar
43 Leaf spring
44 Tightening device
45 Clamping jaws
46 Vertical slot
47 Guide section
a First spacing
b Second spacing
P Support point

What is claimed is:

1. A steering column for a motor vehicle, comprising:
a shell part,
a steering shaft including a longitudinal axis and is mounted rotatably in the shell part,
a guide part configured to hold the shell part,
an energy absorption device operatively disposed between the guide part and the shell part, the energy absorption device including:
a bending wire with a first end section and a second end section, the bending wire coupled to the shell part by the first end section and to the guide part by the second end section,
a rail attached by a side wall to the shell part, and
a pin coupled to the guide part,
wherein the second end section of the bending wire has a coupling section that engages behind the pin and is braced at least at a support point on the side wall in response to a crash, wherein the support point is arranged on the side of the pin that is gripped by the coupling section, and
wherein the pin has a first spacing from the side wall, while a second spacing between the pin and the support point measuring in the axial direction is at least 1.1 times the first spacing.

2. The steering column of claim 1, comprising a toothed plate, the pin being connected to the toothed plate, the toothed plate configured to axially move with respect to the guide part and is configured to be axially arrestable by a locking device with respect to the guide part, so that under the action of axial forces arising in a crash an axial displacement of the shell part with respect to the toothed plate arrested on the guide part deforms the bending wire and a portion of kinetic energy generated in the crash is absorbed by the bending wire.

3. The steering column of claim 2, the energy absorption device comprising at least two bending wires arranged axially one behind the other, the toothed plate comprising at least two radially projecting pins, a first pin being situated at an axial spacing from a second pin, and the second end sections of the at least two bending wires, which are respectively broadened at coupling sections, engage behind the respective pins and are braced against the side wall of the rail at a respective support point, and at least one of the two bending wires is configured to be deactivated by means of a switch.

4. The steering column of claim 3, wherein at least one second pin of the toothed plate is configured as a sliding block and is received axially movably in a longitudinal groove of the toothed plate, wherein the axial displacement of the sliding block in the longitudinal groove is configured to be blocked by a bolt which is retractable by means of the switch.

5. The steering column of claim 3, wherein the switch is a pyrotechnic switch.

6. The steering column of claim 1, wherein the coupling section of the bending wire has a horn-shaped supporting section, whose free end is braced against the side wall of the rail at the support point.

7. The steering column of claim 6, wherein the first protrusion of the shell part extends axially across a portion of the first end section, against which the protrusion lies, and a second protrusion and a third protrusion of the shell part are arranged opposite the first protrusion, the second protrusion and the third protrusion being arranged at an axial spacing with respect to each other.

* * * * *